(12) United States Patent
Lin (10) Patent No.: US 8,242,938 B2
(45) Date of Patent: Aug. 14, 2012

(54) LUMINOUS KEYBOARD

(75) Inventor: Chin-Yi Lin, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 214 days.

(21) Appl. No.: 12/852,796

(22) Filed: Aug. 9, 2010

(65) Prior Publication Data

US 2012/0032820 A1 Feb. 9, 2012

(51) Int. Cl.
*H03K 17/94* (2006.01)
(52) U.S. Cl. .............................. 341/22; 341/31
(58) Field of Classification Search .............. 341/22, 341/31; 200/269, 314, 319, 341
See application file for complete search history.

(56) References Cited

U.S. PATENT DOCUMENTS

| | | | |
|---|---|---|---|
| 6,648,530 B2 * | 11/2003 | Kamei et al. | 400/472 |
| 6,803,903 B1 * | 10/2004 | Ostergård et al. | 345/168 |
| 6,987,466 B1 * | 1/2006 | Welch et al. | 341/22 |
| 7,053,799 B2 * | 5/2006 | Yu et al. | 341/31 |
| 7,283,066 B2 * | 10/2007 | Shipman | 341/22 |
| 7,357,523 B2 | 4/2008 | Kao et al. | |

FOREIGN PATENT DOCUMENTS

TW M321551 11/2007

* cited by examiner

*Primary Examiner* — Henry Choe
(74) *Attorney, Agent, or Firm* — Muncy, Geissler, Olds & Lowe, PLLC (57) ABSTRACT

A luminous keyboard comprises a housing, a keyboard and a light emitting portion. The keyboard and light emitting portion are held in the housing. The light emitting portion includes at least one housing trough and a lighting element held in the housing trough. The housing trough has at least one first recess portion and at least one second recess portion on the periphery. The first recess portion and second recess portion have respectively an inner wall formed a first curved surface and a second curved surface. The lighting element generates light projected to the first and second recess portions, and the light piercing through the first and second curved surfaces is transmitted towards the concave directions of the first and second recess portions. Thus the light advancing direction in the light emitting portion can be effectively controlled.

15 Claims, 7 Drawing Sheets

LUMINOUS KEYBOARD

FIELD OF THE INVENTION

The present invention relates to a luminous keyboard and particularly to a luminous keyboard to efficiently utilize light sources to generate desired luminosity.

BACKGROUND OF THE INVENTION

In order to meet varying users' requirements, many types of luminous keyboards have been developed and introduced to the market to enable users to clearly recognize locations of keys and character notations in a light deficient environment without erroneously striking the keys and entering commands.

U.S. Pat. No. 7,357,523 discloses an illuminating keyboard which comprises a keyboard and a backlight means. The keyboard includes a plurality of keys and a bottom plate. The keys are mounted onto the bottom plate and depressible up and down against the bottom plate. The backlight means is located below the keyboard and includes a light guiding plate, a reflective plate and a light source. The reflective plate is located below the light guiding plate which has a plurality of openings to hold the light source. The light source provides light needed by the keyboard.

R.O.C. patent No. M321551 also discloses an illuminating keyboard which comprises a circuit board, a keyboard, a light guiding plate, a plurality of light emitting diodes (LEDs) and a reflective plate. The circuit board, keyboard and light guiding plate are made of light permeable materials. The circuit board has a plurality of elastic pieces on the surface at one side. The keyboard covers one side of the circuit board where the elastic pieces are located. The keyboard has a plurality of keys corresponding to the elastic pieces. The light guiding plate covers another side of the circuit board with a plurality of opening sets formed thereon corresponding to the keys. The opening sets are interposed by a plurality of housing troughs to hold the LEDs. The reflective plate is bonded to another surface of the light guiding plate to reflect light emitted from the LEDs upwards to the keys.

The openings on the aforesaid light guiding plate are respectively formed in a rectangular shape and each has four side walls perpendicular to each other. The side walls are served as light incident surfaces of the light entering the light guiding plate. In practice, the light refracted by the side walls cannot be fully transmitted in the light guiding plate, hence is not fully refracted to the light guiding plate to generate sufficient luminosity on the keycaps. In such a structure, in order to generate equal luminosity on the keys, the distance between the openings has to be shortened, hence more lighting elements are needed. As a result, production cost is higher.

SUMMARY OF THE INVENTION

The primary object of the present invention is to solve the problem of the conventional illuminating keyboards that have to install a great number of lighting elements in the light guiding plate to generate sufficient luminosity on the keycaps.

To achieve the foregoing object, the present invention provides a luminous keyboard which comprises a housing and a keyboard. The housing includes an opening to hold the keyboard and a light emitting portion held in the housing. The light emitting portion includes at least one housing trough and a lighting element held in the housing trough. The housing trough has at least one first recess portion and at least one second recess portion on the periphery communicating with the housing trough. The first recess portion and second recess portion have respectively an inner wall formed a first curved surface and a second curved surface. The lighting element generates light projecting to the first and second recess portions, such that the light can pierce through the first and second curved surfaces to be transmitted in the light emitting portion and be projected to the keyboard.

Thus, the light is refracted by the first and second curved surfaces and has a great portion transmitting towards the concave directions of the first and second recess portions. Therefore, its utilization improves, and the number of the lighting elements can be reduced to lower production cost.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
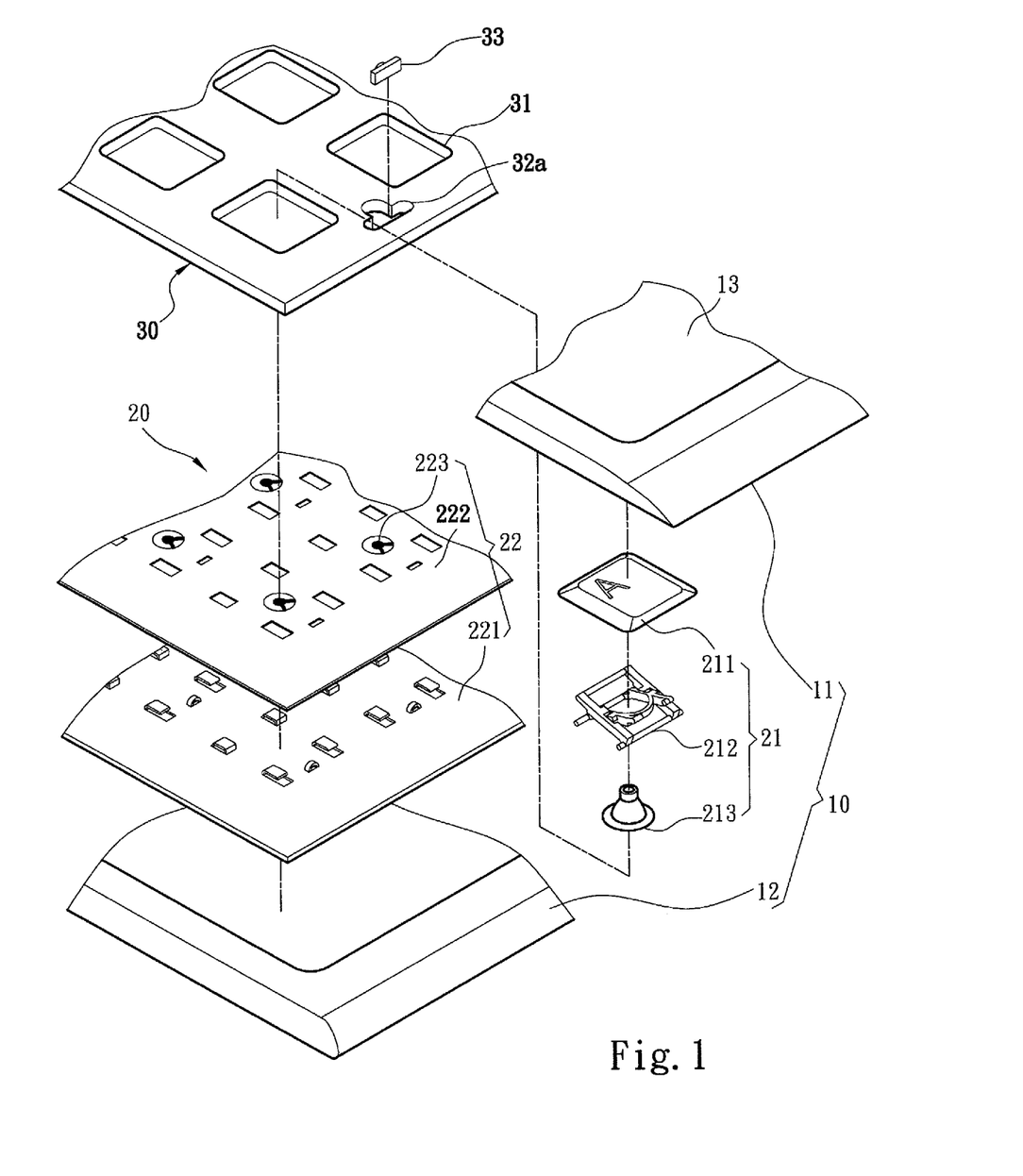
FIG. 1 is a partial exploded view of a first embodiment of the luminous keyboard of the invention.

Please refer to FIG. 1 for a first embodiment of the invention. The luminous keyboard of the invention comprises a housing 10, a keyboard 20 and a light emitting portion 30. The housing 10 includes a top cover 11 and a bottom cover 12 that are assembled together. The top cover 11 has an opening 13 to hold the keyboard 20. The light emitting portion 30 is held in the housing 10.

The keyboard 20 includes a plurality of depressible elements 21 and a baseboard 22 carrying the depressible elements 21. The depressible elements 21 pass through the opening 13, and each depressible element 21 includes a keycap 211, a driven means 212 bridging the keycap 211 and baseboard 22, and an elastic element 213 located in the driven means 212. The elastic element 213 provides a return force for the keycap 211 to move reciprocally relative to the baseboard 22. The baseboard 22 includes a support board 221 and a circuit board 222 triggered by the keycaps 211 to generate command signals. The support board 221 is coupled with the driven means 212. The circuit board 222 has a plurality of circuit switches 223 corresponding to the keycaps 211. The circuit board 222 is triggered by the keycaps 211 to generate the command signals.

Figure 2:
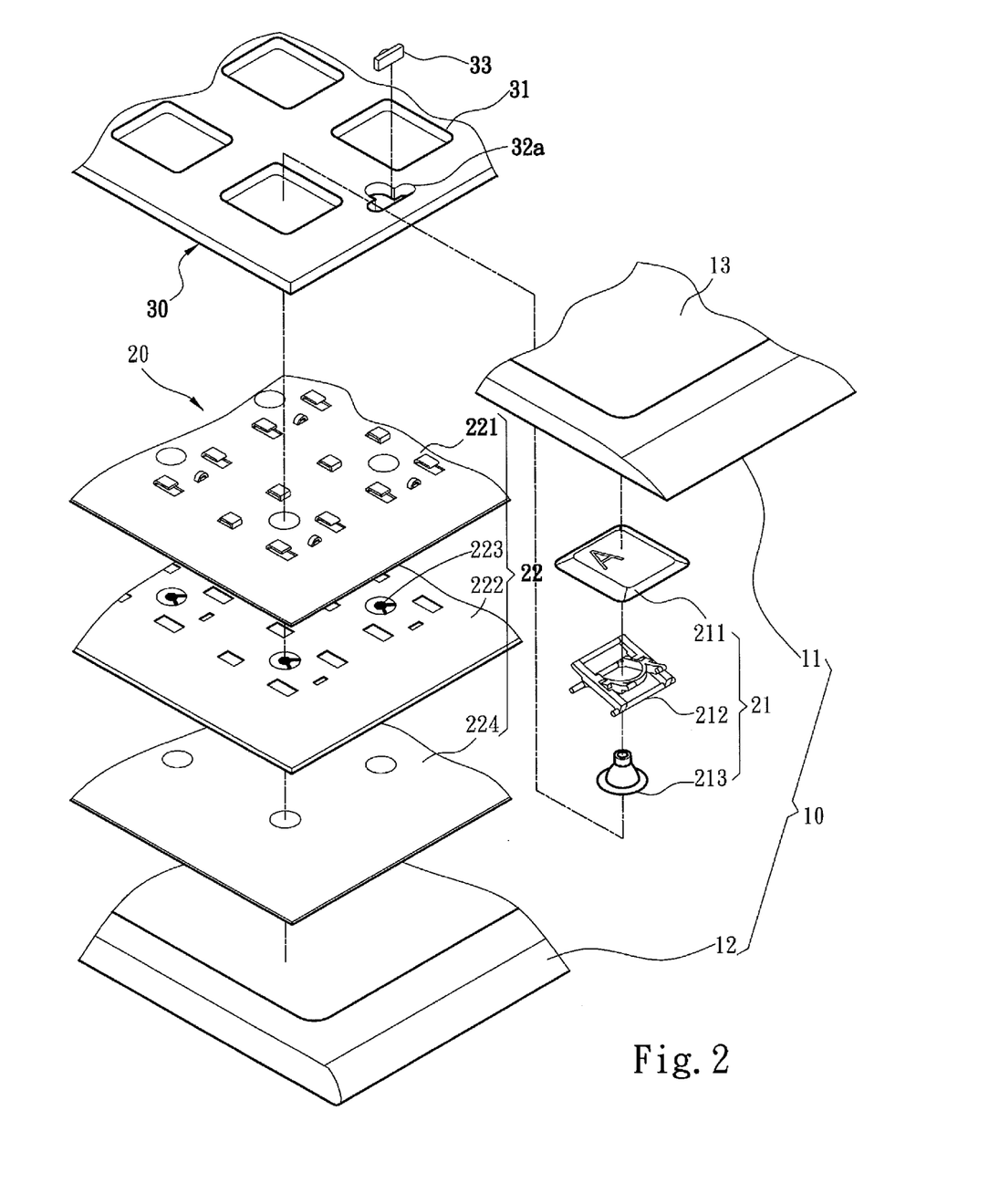
FIG. 2 is a partial exploded view of a second embodiment of the luminous keyboard of the invention.

In the invention, the light emitting portion 30 can be located at any location in the housing 10. In the first embodiment shown in FIG. 1, the circuit board 222 is located above the support board 221, and the light emitting portion 30 is located between the keycaps 211 and circuit board 222. FIG. 2 shows a second embodiment in which the circuit board 222 also can be located below the support board 221, but an additional bottom board 224 is provided below the circuit board 222. The light emitting portion 30 is located between the keycaps 211 and the support board 221. Besides the aforesaid configurations, in the first embodiment, the light emitting portion 30 may also be located between the support board 221 and circuit board 222, or between the support board 221 and the bottom cover 12. In the second embodiment, the light emitting portion 30 may also be located between the support board 221 and circuit board 222, or between the bottom board 224 and circuit board 222, or between the bottom board 224 and bottom cover 12.

The light emitting portion 30 may be made of Poly(methyl methacrylate), Acrylonitrile butadiene styrene, Poly(methyl methacrylate), Polycarbonate or other light guiding materials and formed in a board shape. In the first and second embodiments set forth above, the light emitting portion 30 can be located between the keycaps 211 and circuit board 222, and between the keycaps 211 and the support board 221. The light emitting portion 30 also has a plurality of apertures 31 corresponding to the driven means 212 for holding thereof. The light emitting portion 30 includes at least one housing trough 32a and a lighting element 33 located in the housing trough 32a to generate light.

Figure 3:
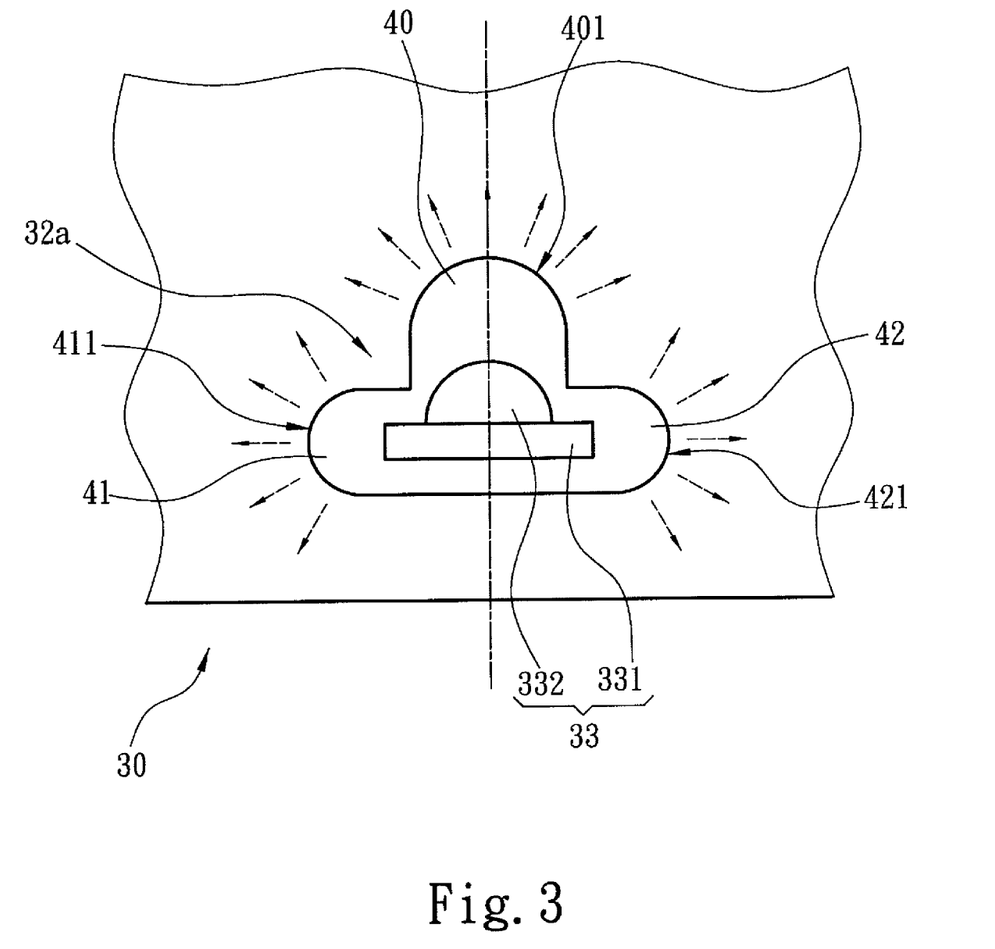
FIG. 3 is a top view of a first embodiment of the housing trough of the luminous keyboard of the invention.
Figure 4:
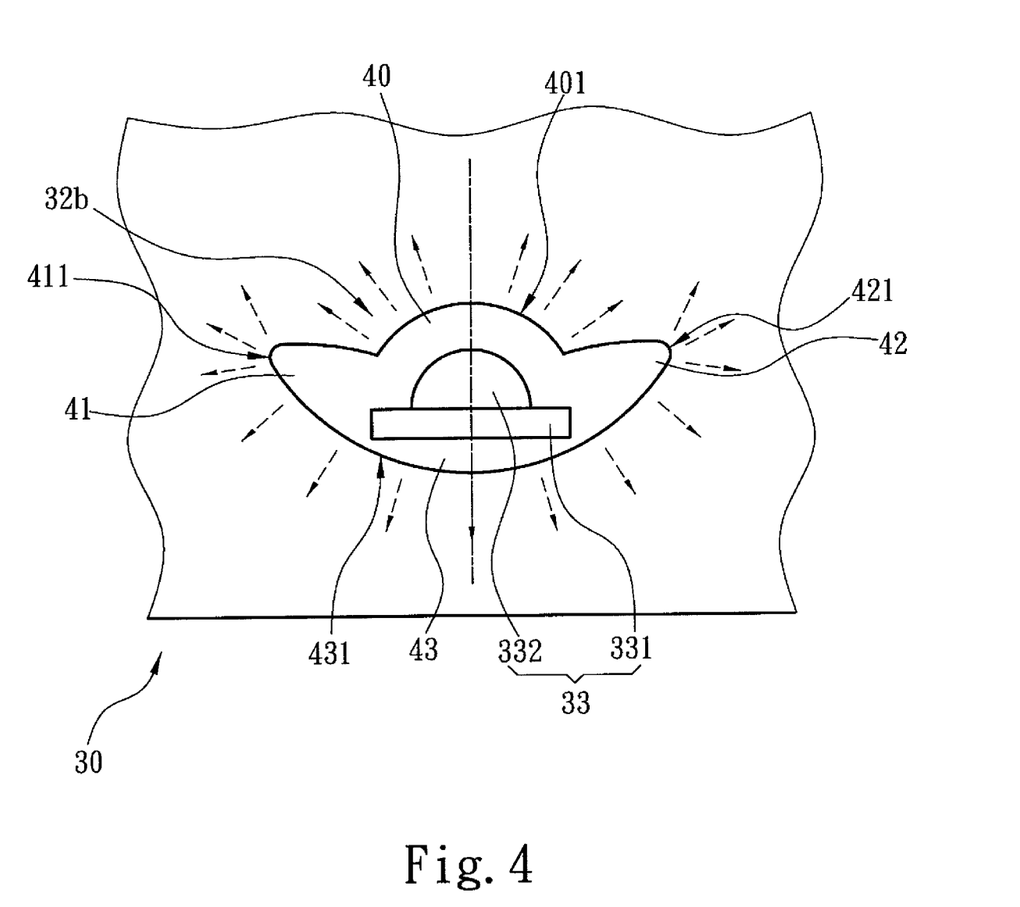
FIG. 4 is a top view of a second embodiment of the housing trough of the luminous keyboard of the invention.

Refer to FIG. 3 for a first embodiment of the housing trough 32a. The housing trough 32a has at least one first recess portion 40 and two second recess portions 41 and 42 on the periphery. However, the second recess portions are not limited to the number of two. The first recess portion 40 has an inner wall formed a first curved surface 401, while the second recess portions 41 and 42 have respectively an inner wall formed a second curved surface 411 and 421. In the housing trough 32a, the second recess portions 41 and 42 are located symmetrically at two sides of the first recess portion 40 about an axis of symmetry shown by a broken line in the middle of FIG. 3. The first curved surface 401 and second curved surfaces 411 and 421 are formed respectively in a semicircular shape, with the curvature radius of the first curve surface 401 greater than that of the second curved surfaces 411 and 421. The second curved surfaces 411 and 421 have the same curvature radius. Moreover, the lighting element 33 includes a base 331 and at least one LED 332. The LED 332 has a bottom fastened to one side of the base 331. Refer to FIG. 4 for a second embodiment of the housing trough 32b. The housing trough 32b has two first recess portions 40 and 43. The first recess portion 43 is located at one side of the housing trough 32b opposite to another first recess portion 40. The second recess portions 41 and 42 also are located symmetrically at two sides of the first recess portion 40 about an axis of symmetry shown by a broken line in the middle of FIG. 4. The second curved surfaces 411 and 421 have respectively an apex shifted slightly towards the concave direction of the first recess portion 40 and are respectively formed in a semi-ellipsoidal shape. The first curved surfaces 401 and 431 are formed at different curvature radiuses.

Figure 5:
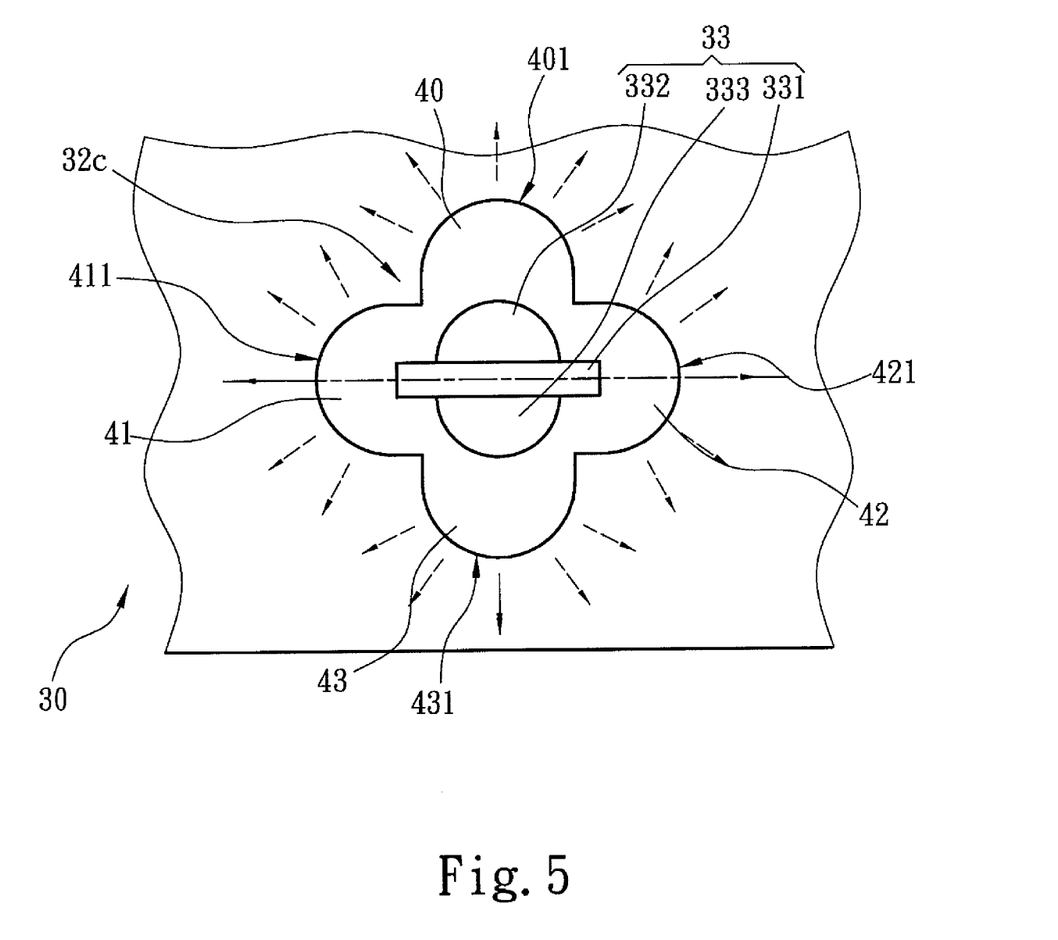
FIG. 5 is a top view of a third embodiment of the housing trough of the luminous keyboard of the invention.
Figure 6:
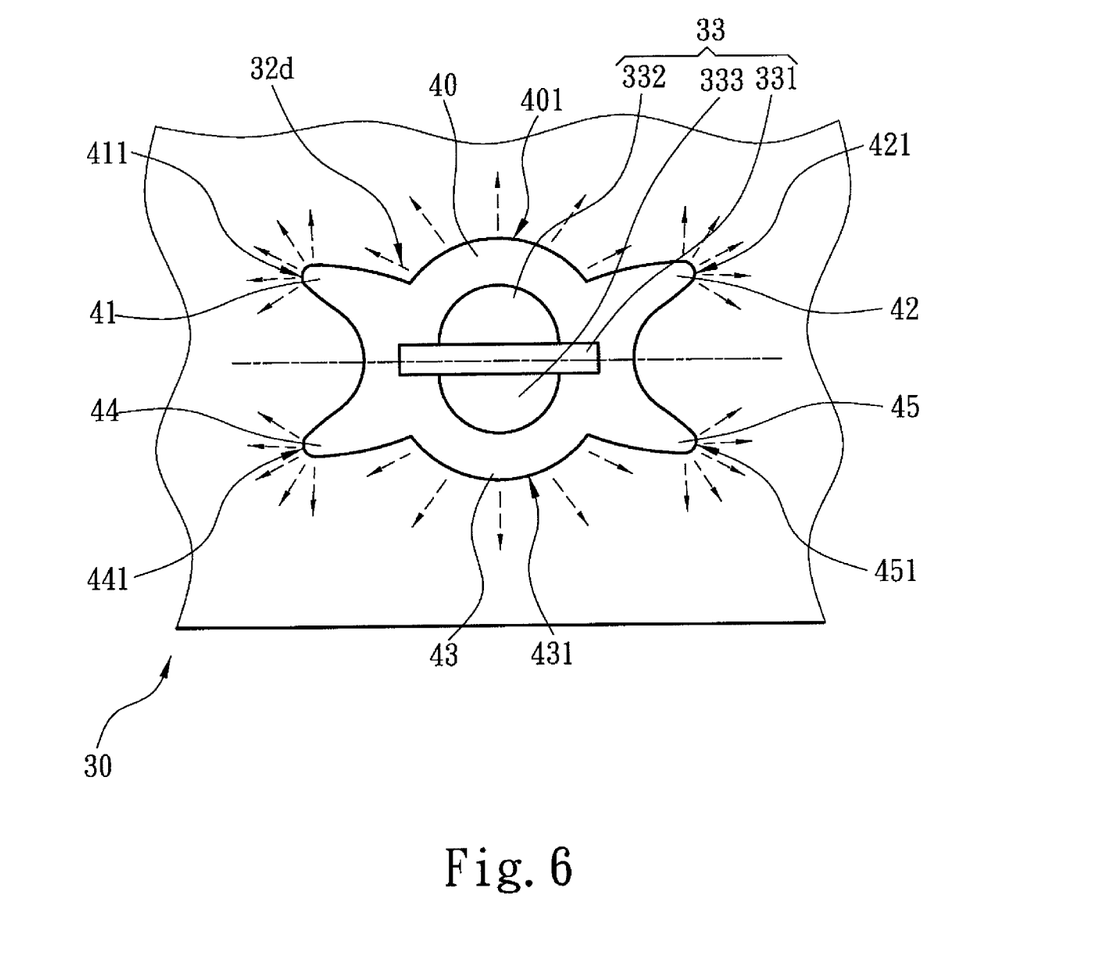
FIG. 6 is a top view of a fourth embodiment of the housing trough of the luminous keyboard of the invention.

Refer to FIG. 5 for a third embodiment of the housing trough 32c. The housing trough 32c has the first recess portions 40 and 43 symmetrically located at two sides of the second recess portions 41 and 42 about an axis of symmetry shown by a broken line in the drawing. The first curved surfaces 401 and 431 and second curved surfaces 411 and 421 are formed respectively in a semicircular shape, and also at a same curvature radius. In the lighting element 33, in addition to an LED 332 mounted on one side of the base 331, the lighting element 33 has another LED 333 located on another side of the base 331. FIG. 6 shows a fourth embodiment of the housing trough 32d. In addition to the second recess portions 41 and 42, two more second recess portions 44 and 45 are provided to form respectively a second curved surface 441 and 451 on the inner wall. The first curved surfaces 401 and 431 of the first recess portions 40 and 43 have a same curvature radius. Such a structure is accomplished by symmetrically positioning the first recess portion 40 and second recess portions 41 and 42 shown in FIG. 4 about an axis of symmetry shown by a broken line in FIG. 6. Moreover, the base 331 has LEDs 332 and 333 located on the surfaces at two sides. In the light emitting portion 30, the light emitted from the LEDs 332 and 333 is directly projected or reflected to the first recess portions 40 and 43 and second recess portions 41, 42, 44 and 45, and pierces through the first curved surfaces 401 and 431 and second curved surfaces 411, 421, 441 and 451 to be transmitted. In addition to the aforesaid embodiments, the first recess portions 40 and 43 and second recess portions 41, 42, 44 and 45 may also be formed in other shapes and numbers according to actual requirements.

Figure 7:
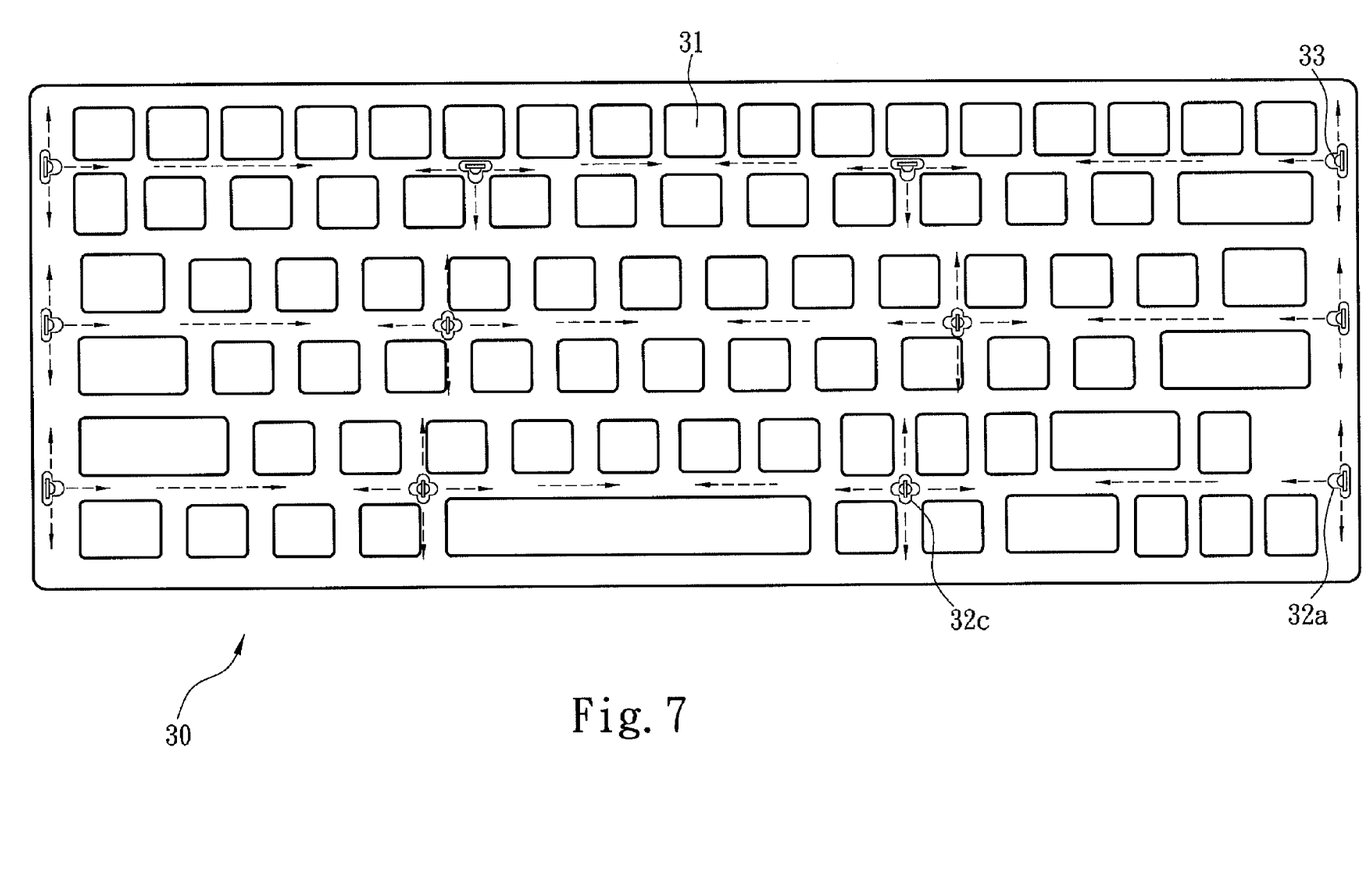
FIG. 7 is a schematic view showing the light transmitting in the light emitting portion according to the invention.

In the invention, the light emitting portion 30 can also include different types of housing troughs 32a, 32b, 32c and 32d in a mixed fashion. FIG. 7 shows a schematic view of light transmitting in the light emitting portion. The light emitting portion 30 has the housing trough 32a shown in FIG. 3 formed on the periphery, and the housing troughs 32a and 32c shown in FIGS. 3 and 5 in the middle portion in a mixed fashion. A great portion of light is transmitted towards the concave portions of the first recess portions 40 and 43 and second recess portions 41 and 42, thus the light can be transmitted in light emitting portion 30 in longitudinal and transverse directions where no aperture 31 is formed to generate luminosity on the keycaps 211.

As a conclusion, the luminous keyboard of the invention mainly provides the first recess portion and second recess portion in the housing trough. Light is refracted by the first curved surface and second curved surface, such that the light can be transmitted towards the concave directions of the first and second recess portions to be efficiently utilized. As a result, the number of lighting elements in the luminous keyboard can be greatly reduced and keycaps can have even luminosity, thus production cost of the luminous keyboard can be lower. It provides a significant improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:
1. A luminous keyboard, comprising:
a housing and a keyboard, the housing including an opening to hold the keyboard; and
a light emitting portion which is held in the housing and includes at least one housing trough and a lighting element held in the housing trough, the housing trough including at least one first recess portion and at least one second recess portion on the periphery that communicate with the housing trough, the first recess portion and the second recess portion respectively including an inner wall formed a first curved surface and a second curved surface, the lighting element generating light projected to the first recess portion and the second recess portion and the light piercing through the first curved surface and the second curved surface to be transmitted in the light emitting portion and projected to the keyboard.

2. The luminous keyboard of claim 1, wherein the keyboard includes a plurality of depressible elements passing through the opening and a baseboard to carry the depressible elements.

3. The luminous keyboard of claim 2, wherein each of the depressible elements includes a keycap, a driven means bridging the keycap and the baseboard and an elastic element located in the driven means, the elastic element providing a return force for the keycap to move reciprocally relative to the baseboard.

4. The luminous keyboard of claim 3, wherein the baseboard includes a support board coupled with the driven means and a circuit board triggered by the keycap to generate a command signal.

5. The luminous keyboard of claim 4, wherein the circuit board is located above the support board.

6. The luminous keyboard of claim 4, wherein the circuit board is located below the support board and the baseboard includes a bottom board located below the circuit board.

7. The luminous keyboard of claim 1, wherein the lighting element includes a base and at least one light emitting diode located on the base.

8. The luminous keyboard of claim 2, wherein the light emitting portion includes a plurality of apertures corresponding to the depressible elements.

9. The luminous keyboard of claim 4, wherein the light emitting portion is located between the keycap and the circuit board.

10. The luminous keyboard of claim 5, wherein the light emitting portion is located between the keycap and the support board.

11. The luminous keyboard of claim 8, wherein the housing trough is located between the neighboring apertures.

12. The luminous keyboard of claim 1, wherein the first curved surface and the second curved surface are formed at different curvature radiuses.

13. The luminous keyboard of claim 1, wherein the first curved surface and the second curved surface are formed at a same curvature radius.

14. The luminous keyboard of claim 1, wherein the first curved surface is formed in a semicircular shape.

15. The luminous keyboard of claim 1, wherein the second curved surface is formed in a semi-ellipsoidal shape.

* * * * *